July 17, 1928.
F. DELY
VENTILATOR
Filed Aug. 11, 1927
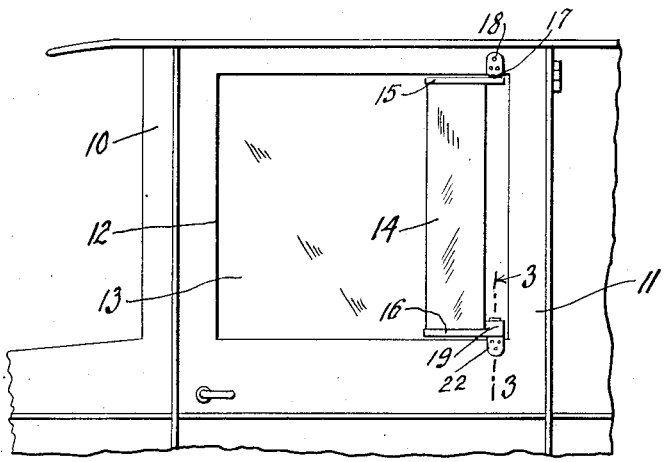
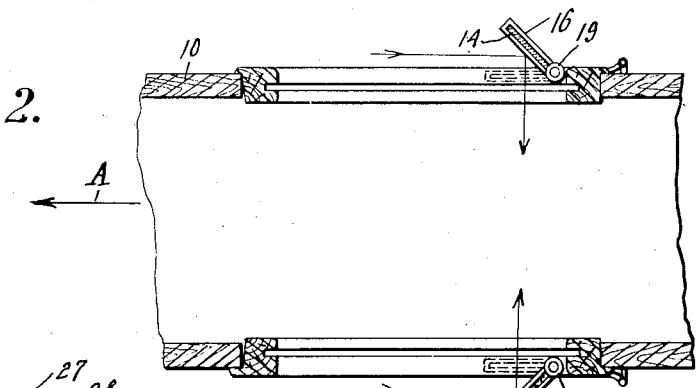
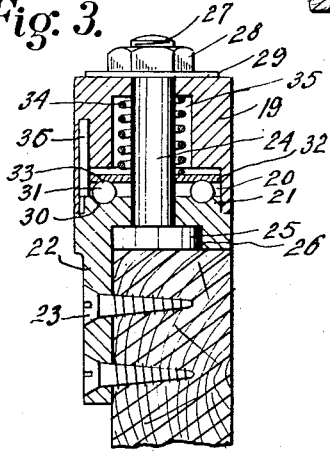
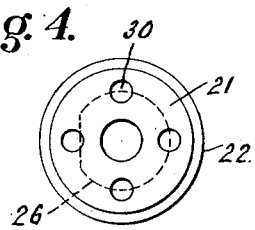
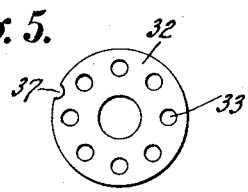
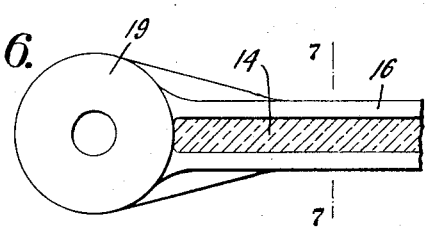
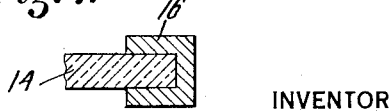
INVENTOR
F. Dely
BY
Edmund Herzog
ATTORNEY Patented July 17, 1928.

1,677,711

UNITED STATES PATENT OFFICE.

FRANK DELY, OF NEW YORK, N. Y.

VENTILATOR.

Application filed August 11, 1927. Serial No. 212,257.

The present invention relates to improvements in motor vehicles, and more particularly to closed vehicles, that is to say such as have bodies formed of one or more enclosed compartments.

The main object of the invention is to provide a vehicle body with a simple and efficient means for ventilating the interior thereof, the arrangement being such that, when the vehicle is in motion, air is deflected into the interior of the vehicle without the aid of special machinery or rotating contrivances.

Another object of the invention is to so construct the ventilating device that it can be readily mounted upon vehicles without necessitating changes in the construction of the latter.

A further object of the invention is to provide a ventilating device in the form of panels so mounted adjacent the window openings of the vehicle, that the same are adapted to be conveniently swung to inoperative positions.

A still further object of the invention is to provide a simple mechanism for firmly holding the panels both in operative and inoperative positions.

With these and other objects in view, which will more fully appear as the nature of the invention is better understood, the same consists in the combination, arrangement and construction of parts hereinafter described, pointed out in the appended claim and illustrated in the accompanying drawings, it being understood that many changes may be made in the size and proportion of the several parts and details of construction within the scope of the appended claim, without departing from the spirit or sacrificing any of the advantages of the invention.

One of the many possible embodiments of the invention is illustrated in the accompanying drawings, in which:—

Figure 1 is a side elevation of the front portion of a motor vehicle having a closed body and showing the improved ventilator mounted upon the front door thereof; Fig. 2 is a horizontal section taken through a portion of the vehicle and said ventilating device; Fig. 3 is a section taken on line 3—3 of Fig. 1, on a larger scale; Fig. 4 is a top plan view of the stationary bracket shown in Fig. 3; Fig. 5 is a bottom plan view of the ball retaining member shown in Fig. 3; Fig. 6 is a top plan view of a portion of the lower one of the panel supporting means, the panel being shown in section; and Fig. 7 is a section taken on line 7—7 of Fig. 6.

In the drawings, the numeral 10 indicates the forward portion of the body of a closed motor vehicle, and the numeral 11 the door thereof. This door is provided in its upper portion with a window opening 12, adapted to be closed by a pane 13 of glass which is capable of being raised or lowered, according to the requirements, in any approved manner. This window pane affords some means of ventilation, but does not create a draught of air through the vehicle body.

In order to induce a natural draught of air, there is associated with each window of the vehicle body a panel 14 of transparent material, such as glass, turning on vertical pivots, which are mounted on the outer surface of and adjacent the rear edge of the window opening. The upper and lower edges of the panel 14 are seated in horizontally extending channel members 15 and 16, respectively. The channel member 15 is provided adjacent its rear end with a pivot pin 17, turning on a bracket 18, the latter being attached by screws, or otherwise, to the outer face of the door 11 adjacent the rear edge of the window opening 12 and above the upper edge of the said window opening. The channel member 16 is provided at its rear end with a bearing member 19, having in its underface a circular recess 20, into which is fitted the cylindrical reduced extension 21 of a bracket 22, the latter being fixed by screws 23, or otherwise, to the outer face of the door 11 in alignment with the bracket 18 but at the lower edge of the window opening 12. The bearing member 19 is adapted to turn on the bracket 22, and a connection between the said two members is made by a vertical screw-bolt 24. This screw-bolt is in alignment with the pivot pin 17 above referred to. The head 25 of this screw-bolt is disposed in a recess 26 in the bracket 22, the bolt extending through the said bracket and the bearing member. The screw-threaded upper end 27 of the bolt is in engagement with a nut 28, abutting against a washer 29, the latter resting upon the upper face of the bearing member 19. In the upper face of the reduced extension 21 of the bracket are provided recesses 30, which are arranged on a circle and spaced equidistantly. In each of these recesses is seated a ball 31, held therein by a disk-shaped ball retaining member 32, which is provided in its underface with recesses 33. The recesses 33 are also disposed on a circle and are spaced equidistantly. The number of recesses 33 is twice that of the recesses 30, as clearly appears from Figs. 4 and 5 of the drawings. The ball retaining member 32 is yieldingly held in position by a spring 34, which is coiled around the screw-bolt 24 and is disposed in a recess 35 in the bearing member 19. The ball retaining member turns with the bearing member 19, and the connection between these two elements is made by a pin 36, carried by the bearing member and seated in a peripheral notch 37 in the ball retaining member.

As appears from Figs. 4 and 5 of the drawings, the bracket 22 is provided with four recesses 30 and the ball retaining member 32 has eight recesses, four of which are in registering positions with the recesses 30. The remaining four recesses in the ball retaining member are disposed midway between those recesses which register with the recesses 30. The purpose of this arrangement will be described hereinafter.

With reference to Fig. 2 of the drawings, it will be noted that the bearing member 19 is disposed as close as possible to the window pane 13, so that, when the channel member 16 is arranged in parallel relation to the window pane, the ventilator herein described is disposed within the door 11, as clearly shown in dotted lines in Fig. 2 of the drawings. In this position the ventilator does not project beyond the outer face of the door.

When the panels 14 are held in parallel relation to the window panes 13, as shown in dotted lines in Fig. 2 of the drawings, they do not function as ventilating devices. When the windows in the door frames are lowered and the panels 14 are turned so as to extend at an angle to the outer faces of the door frames, as shown in full lines in Fig. 2 of the drawings, it is obvious that, when the vehicle moves in the direction of the arrow A shown in Fig. 2 of the drawings, air striking the panels 14 is deflected into the interior of the vehicle body, as indicated by the arrows adjacent the said panels, so that the interior of the vehicle is properly ventilated. The ventilator is fixed both in its inoperative and operative positions by the balls 31, which are seated in the recesses 30 and 33 in the bracket 22 and the ball retaining member 32, respectively. When the ventilator is shifted from the position shown in dotted lines in Fig. 2 of the drawings into the position shown in full lines therein, the balls are unseated from four recesses in the ball retaining member 32, the latter moving in the direction of the longitudinal axis of the bolt 24 and then with the bearing member 19 until the remaining four recesses in said ball retaining member are in alignment with the balls, when the spring 34 forces the ball retaining member back to its position shown in Fig. 3 of the drawings, in which the balls are again seated in recesses therein. The ventilator then extends at an angle of 45° to the respective window pane 13. It is obvious, however, that the recesses 30 and 33 may be disposed in any other suitable manner, so that the ventilator may be arranged at other angles, if desired.

What I claim is:—

A motor vehicle comprising a closed body, a door associated with said body having a window opening, a window pane slidable in said opening, two brackets secured to the outer face of said door above and below the window opening therein and adjacent the rear edge of said opening, the lower one of said brackets having a cylindrical extension within said window opening, a horizontal channel member having a vertical pivot pin in alignment with said cylindrical extension and rotatable on said upper bracket, a second horizontal channel member provided with a bearing member rotatable on the cylindrical extension of said lower bracket, a vertical bolt connecting said bearing member and said lower bracket, said bolt being in alignment with the pivot pin on said first-mentioned channel member, a panel engaging said two channel members, the upper face of said cylindrical extension being provided with a plurality of recesses arranged on a circle, a ball in each recess, a ball retaining member in said bearing member fixed thereto so as to rotate with the same but permitted to move in the direction of the longitudinal axis of said bolt, said ball retaining member being provided with recesses also arranged on a circle and in which said balls are adapted to be seated, and a spring in said bearing member for forcing said ball retaining member into engagement with said balls, the number of recesses in said ball retaining member exceeding those in said cylindrical extension.

Signed at New York, in the county of New York, and State of New York, this 17th day of June, A. D. 1927.

FRANK DELY.